No. 779,002. PATENTED JAN. 3, 1905.
L. PRIEST.
VEHICLE BODY.
APPLICATION FILED MAY 13, 1903.
2 SHEETS—SHEET 2.
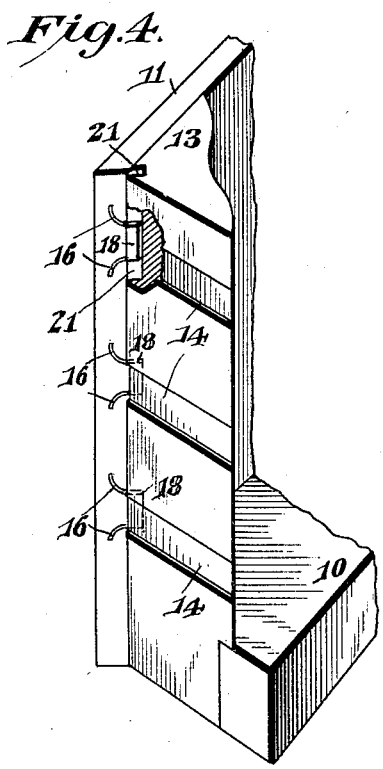
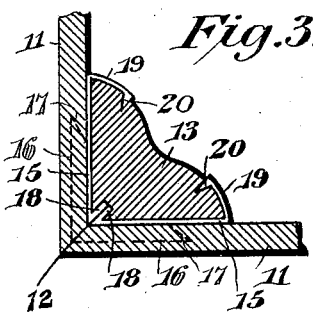
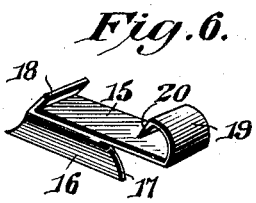
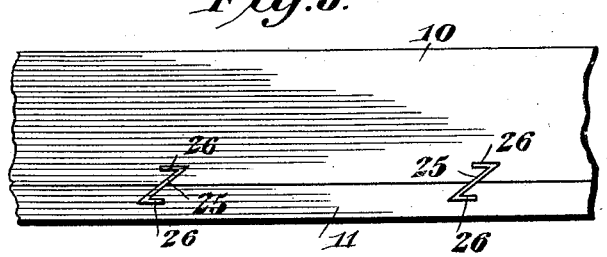
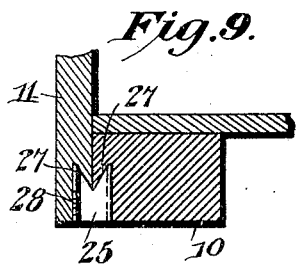
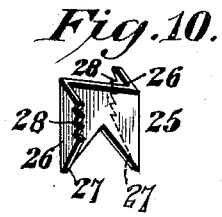
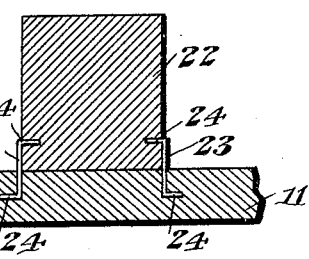
Louis Priest, Inventor
Witnesses No. 779,002. Patented January 3, 1905.

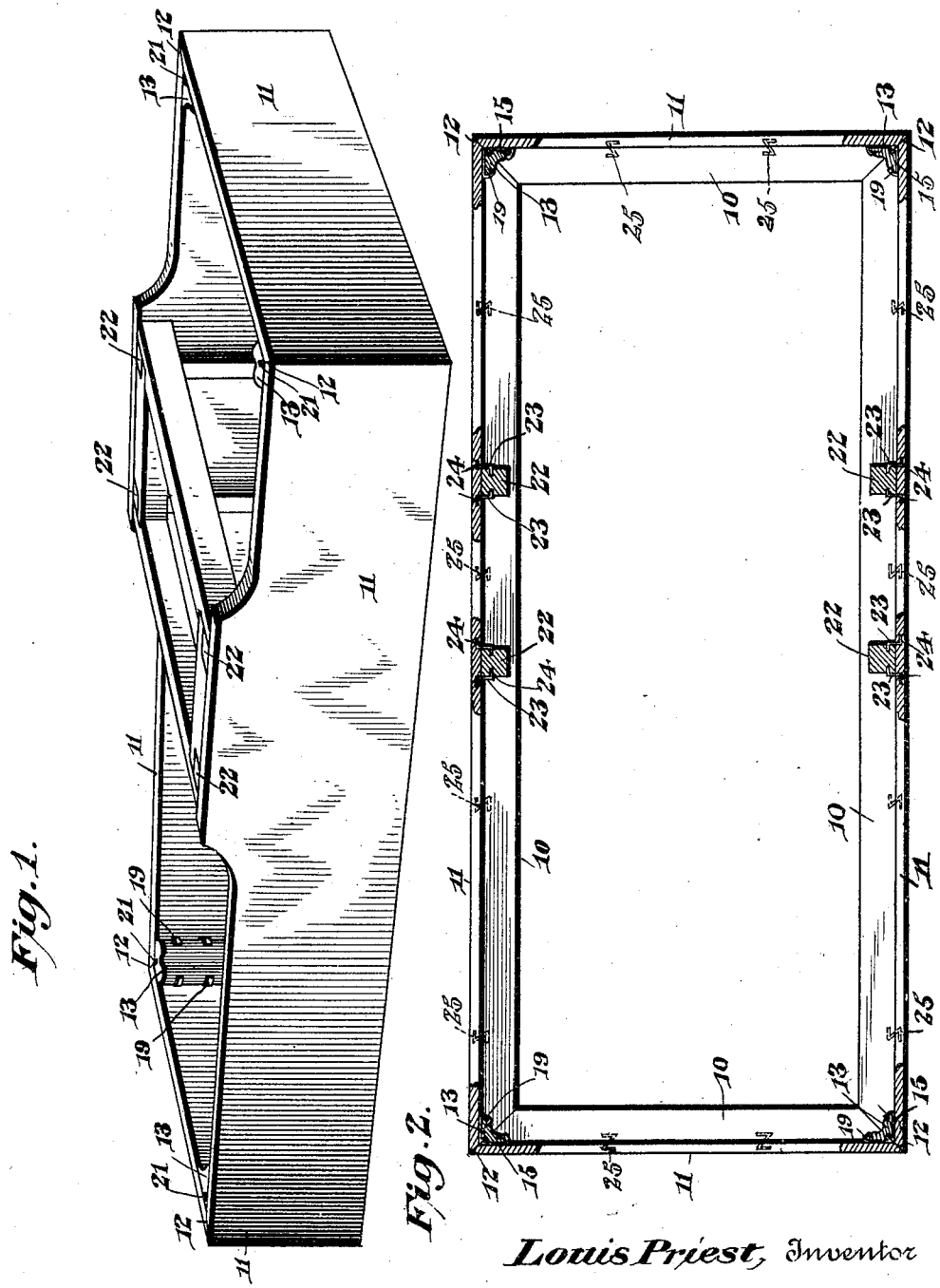

UNITED STATES PATENT OFFICE.

LOUIS PRIEST, OF MOUNT PLEASANT, MICHIGAN.

VEHICLE-BODY.

SPECIFICATION forming part of Letters Patent No. 779,002, dated January 3, 1905.

Application filed May 13, 1903. Serial No. 156,961.

*To all whom it may concern:*

Be it known that I, LOUIS PRIEST, a citizen of the United States, residing at Mount Pleasant, in the county of Isabella and State of Michigan, have invented a new and useful Vehicle-Body, of which the following is a specification.

It is the object of the present invention to provide a structure which can be manufactured at very small cost when compared with the expense in constructing the ordinary bodies. The new structure, furthermore, has no fastening devices passed through the outer faces of the panels, so that said faces are entirely smooth, unbroken, and will not be as liable to check or break as those in which screws are employed that are threaded through the panels and afterward covered with plugs. Further than this it is the object to provide a strong body in which the parts or elements are secured together, so that the panels cannot warp or draw apart because of shrinkage.

The preferred form of construction is illustrated in the accompanying drawings, wherein—

Figure 1 is a perspective view of the improved body. Fig. 2 is a top plan view, a portion thereof being shown in section. Fig. 3 is a horizontal sectional view, on an enlarged scale, through one of the corners. Fig. 4 is a detail perspective view of one corner with one of the panels removed. Fig. 5 is a detail perspective view of one of the connecting devices for the panels and posts, showing the shape of the same before use. Fig. 6 is a similar view of the same device before it has been placed in position. Fig. 7 is a cross-sectional view through the connecting device. Fig. 8 is a bottom plan view of a portion of the body, showing the connecting devices employed between the sill and panel. Fig. 9 is a sectional view through the same. Fig. 10 is a detail perspective of one of the connecting devices. Fig. 11 is a sectional view, on an enlarged scale, through one of the seat-posts and the adjacent portion of the panel. Fig. 12 is a detail perspective view of one of the devices employed in connecting the parts illustrated in Fig. 11.

Similar reference-numerals indicate corresponding parts in all the figures of the drawings.

In the embodiment illustrated an oblong sill-frame 10 is employed, against the outer faces of which are arranged angularly-disposed panels 11, having their ends beveled and abutted, as shown at 12. Located in the angles formed by the panels are corner-posts 13, that fit against the inner faces of the panels and preferably extend to the lower edges of the same, the sill being cut away to permit such extension, as shown in Fig. 4.

Each panel is separately connected with the adjacent post, and for this purpose connecting devices are employed which are interposed between the posts and panels, being seated in transverse sockets 14, formed in the posts. The connecting devices comprise plates 15, having longitudinally-disposed spurs 16 projecting from one side of the same and carried by the side edges, these spurs being preferably curved, as illustrated in Fig. 7, and having their operative ends pointed, as shown at 17. The spurs preferably terminate short of one end of the plate. One end of said plate is provided with a hook 18, projecting from the side opposite the spurs, while the other end is sharpened and is arranged to be bent into a hook 19, having an inturned prong 20. In use the spurs are driven into the ends of the panels, so that the plates 15 will be against the inner faces thereof and arranged to fit in the sockets 14. The hooks 18 engage in a longitudinal groove 21, constituting a seat for the same, which groove is located at the corner of the post. The ends 19 of the connectors project beyond the post and are bent around the same, the prong portions 20 being driven into said post, as illustrated in Fig. 3. As a result the spurs will be embedded in the panels, but will not show upon the outside, while the hooks will embrace the post. The panels are thereby securely fastened to the posts, and the connecting devices are covered with the exception of the last hooks 19. This combination of parts produces an extremely strong corner-joint, firmly holding the abutted ends of the panels together and preventing the ends of said panels warping or cracking.

In order to hold the intermediate portions of the side panels rigid and inflexible, the seat-posts 22, which are arranged against the inner faces of said panels, are secured thereto. To this end connecting devices are employed comprising plates 23, having oppositely-disposed terminals 24, which are driven, respectively, into the panels and posts, as illustrated in Figs. 2 and 11. These connecting devices are located on opposite sides of each post and constitute efficient fasteners for the same. No particular novelty is ascribed to the posts so far as they relate to the seat construction; but in connection with the panels and the means for securing the two members together a very important improvement is derived in that said posts strengthen the panels and keep them from warping. The panels are also fastened to the sills, and for this purpose substantially Z-shaped connecting devices 25 are employed, each being formed of a single piece having oppositely-extending offset terminals 26, the terminals and intermediate portions being pointed, as shown at 27, and said terminals having teeth 28 on their free edges. These connecting devices are driven in the under side of the sills and panels and bridge the joints between them. They are therefore not exposed from the exterior, yet constitute means for securely holding the parts against separation. They can be readily driven into place because of their pointed ends, and yet will not become detached because of the holding-teeth 28, which will engage the adjacent material.

A body constructed in accordance with the present invention can be manufactured much cheaper than the usual structure and has distinct advantages thereover particularly because no fasteners are passed through the outer faces of the panels, so that an unbroken surface may be obtained which will not readily check or crack. The various joints, moreover, are securely held together by means that will not readily become disengaged.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a vehicle-body, the combination with a side wall, of a post extending across the side wall, and a connecting device interposed between the adjacent faces of the wall and post and having its interposed portion secured to one and disposed transversely of the post.

2. In a vehicle-body, the combination with a side wall, of a post extending transversely thereof and having a seat, and a connecting device interposed between the wall and post and having a hook engaging in the seat of the post.

3. In a vehicle-body, the combination with a side wall, of a post extending across the inner face thereof, a connecting device interposed between the adjacent faces of the post and wall and having spurs that engage the wall, and means for securing the device to the post.

4. In a vehicle-body, the combination with a wall, of a post extending transversely thereof, a connecting device having terminal hooks that embrace the post, and means for securing the device to the wall.

5. In a vehicle-body, the combination with a side wall, of a post, and a connecting device having spurs on one side that engage the wall and hooks projecting from its other side and engaging the post.

6. In a vehicle-body, the combination with a side wall, of a post, and a connecting device interposed between the wall and post and comprising a plate having curved spurs projecting from one side and terminal hooks projecting from its opposite side, the hooks engaging the post and the spurs engaging the wall.

7. In a vehicle-body, the combination with a side wall, of a post extending across the same, and a connecting device comprising a plate interposed between the post and wall and having longitudinally-disposed spurs projecting from one side and carried by its longitudinal edges, said spurs engaging the inner side of the wall, and hooks extending from its opposite side and carried by the end edges, said hooks engaging the post.

8. In a vehicle-body, an upright post having a transverse socket in one side, a wall arranged against the post and covering the socket, and a connecting device seated in the socket transversely of the post and interlocked with both the wall and the post.

9. In a vehicle-body, the combination with angularly-disposed side walls, of a post arranged adjacent thereto, and separate connections interposed between the adjacent faces of the walls and post, said devices extending transversely of the post and secured to the same and the walls adjacent thereto.

10. In a vehicle-body, the combination with angularly-disposed side walls having meeting ends, of an upright post located in the angle formed by the walls, and separate connections interposed between the adjacent faces of the walls and post and secured thereto, said devices being located transversely of the post and longitudinally of the walls.

11. In a vehicle-body, the combination with angularly-disposed side walls, of connecting devices having substantially horizontal portions driven longitudinally into the ends of the walls, and means for securing the connecting devices together.

12. In a vehicle-body, the combination with angularly-disposed side walls, of connecting devices located on the inner sides of the walls and having substantially horizontally-disposed spurs driven horizontally into the ends thereof, and means for securing the connecting devices together.

13. In a vehicle-body, the combination with angularly-disposed side walls, of separate connecting devices located on the inner sides of the walls and having spurs driven into said inner sides, and a post arranged in the angle formed by the walls and engaged by the connecting devices of both walls.

14. In a vehicle-body, the combination with angularly-disposed side walls having abutted ends, of a post located in the angle formed by the walls and having transverse sockets and a longitudinally-disposed groove forming a seat, a plurality of connectors interposed between the walls and post and located in the seats of the latter, longitudinally-disposed spurs carried by the devices and engaging the walls, and terminal hooks formed upon the devices and embracing the posts, certain of said hooks being located in the longitudinal groove.

15. In a vehicle-body, the combination with a sill, of a panel fitted against the side of the sill, and a fastening device connecting the sill and panel and driven into the same, said fastening device being of substantially Z shape, one end edge being flat, the opposite end edge being pointed and the side edges being serrated to provide retaining-teeth.

16. In a vehicle-body, the combination with a side wall, of an upright post located transversely against the inner face thereof, and a connecting device interposed between the wall and post and located transversely of the latter, said device being interlocked with both the wall and post.

17. In a vehicle-body, the combination with a side wall, of an upright post located against the inner face thereof and having a transverse seat, and a connecting device comprising a plate located in the seat and having oppositely-extending elements interlocked with the wall and post.

In testimony that I claim the foregoing as my own I have hereto affixed my signature in the presence of two witnesses.

LOUIS PRIEST.

Witnesses:
F. H. DUSENBURY,
WILLIAM C. BROWN.